May 27, 1958 M. K. EADES 2,836,148
MILKING APPARATUS
Filed July 18, 1955 3 Sheets-Sheet 1

Inventor
Marion K. Eades
By Schroeder, Hofgren,
Brady & Wegner
Attorneys

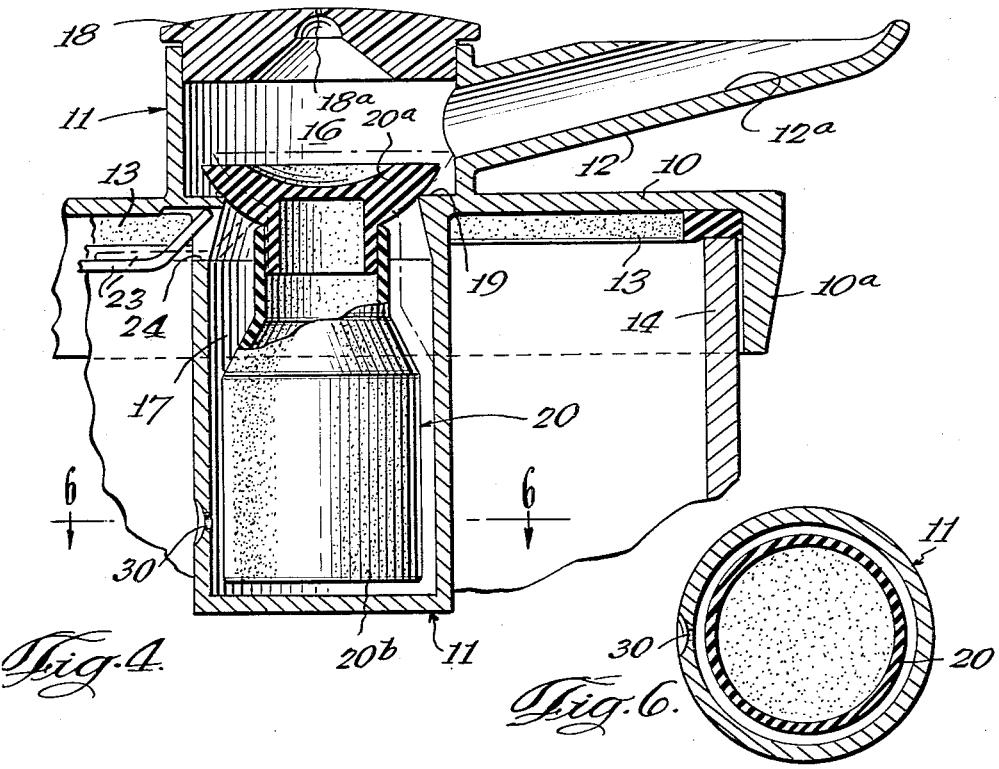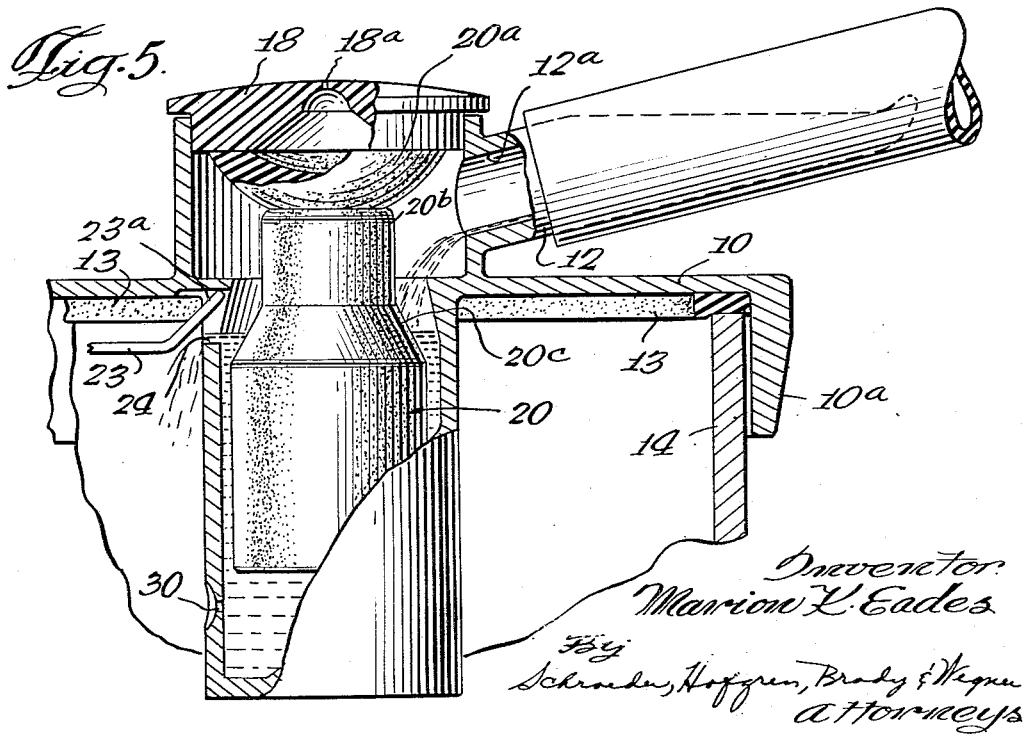

May 27, 1958 M. K. EADES 2,836,148
MILKING APPARATUS

Filed July 18, 1955 3 Sheets-Sheet 3

Inventor
Marion K. Eades

By Schrader, Hoffman, Brady & Wegner
Attorneys

2,836,148

MILKING APPARATUS

Marion K. Eades, Pasadena, Calif.

Application July 18, 1955, Serial No. 522,685

15 Claims. (Cl. 119—14.08)

This invention relates to milking apparatus and more particularly to automatic shut-off milkers.

Automatic shut-off milkers, i. e. milkers in which the vacuum applied to the animal's teats is broken after milk ceases to flow, have gained widely in popularity in the last few years. They are particularly desirable in milking operations where one man handles a large number of cows, as they prevent injury to the cow's teats by breaking the vacuum applied thereto after the animal is milked out.

It is a principal object of this invention to provide a new and improved automatic shut-off milker.

One feature of the invention is the provision of such a milker with a single mechanism operatively associated with the vacuum shut-off valves, for movement opening the valves to start the milking operation. Another feature is that the invention includes a lid member for the milker, means defining a plurality of flow passages extending through the lid for connecting an animal's teats with a source of vacuum and including means defining chambers forming a part of the passages, the chambers having an opening therein, a float valve in each of the chambers and responsive to milk therein to open the passages in the presence of milk and to close the passages in the absence of milk, and a movable member carried on the lid and having valve lifter portions projectable through the openings into the chambers to open the valves.

A further feature is the provision of a vacuum shut-off float valve arrangement which remains open although the milk flowing through the milk passages impinges thereon. Still another feature is that the milk flow passages are arranged to direct the flow of milk toward the side of the float valve.

Further features and advantages will readily be apparent from the specification and from the drawings, in which:

Figure 4 is a fragmentary vertical sectional view of the lid showing the float valve chamber;

Figure 5 is a view similar to Figure 4 showing the chamber full of milk;

Figure 6 is a transverse sectional view taken along the line 6—6 of Figure 4;

Figure 1:
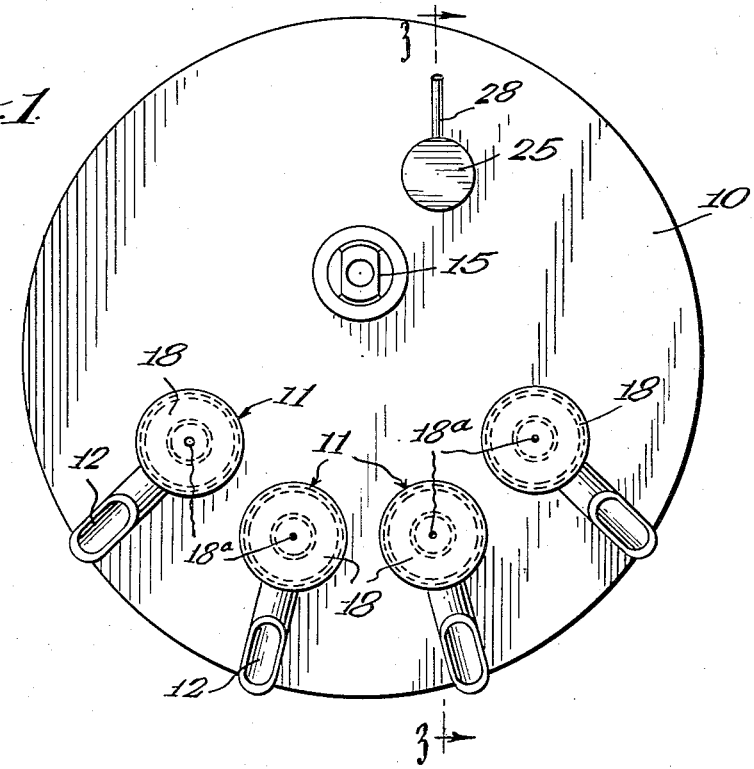
Figure 1 is a top plan view of a milker lid embodying the invention.
Figure 2:
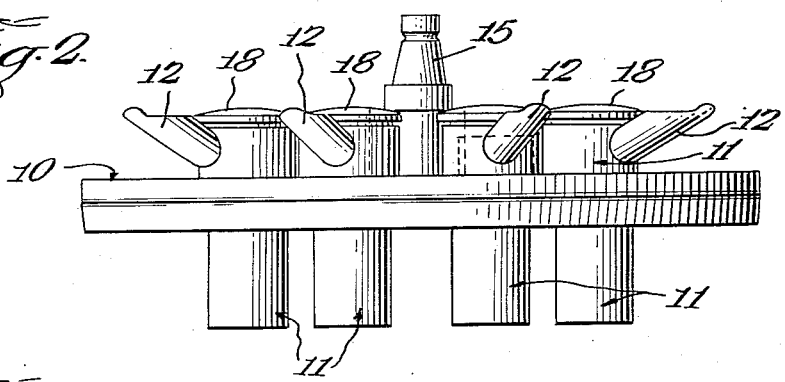
Figure 2 is a front elevational view thereof.
Figure 3:
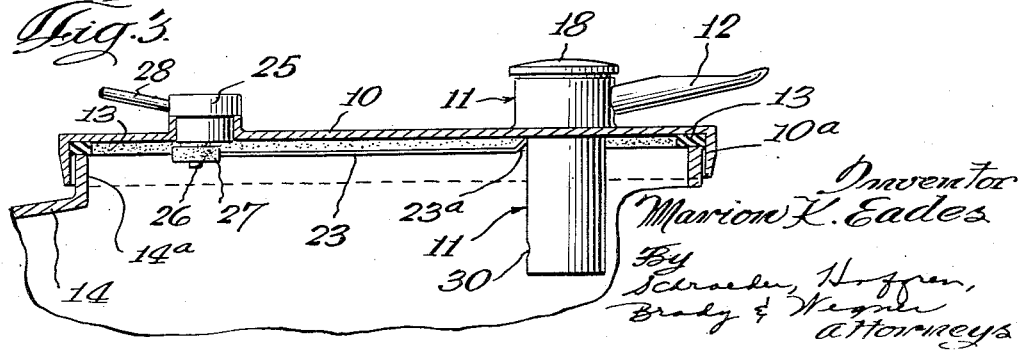
Figure 3 is a vertical sectional view taken substantially along line 3—3 of Figure 1.
Figure 7:
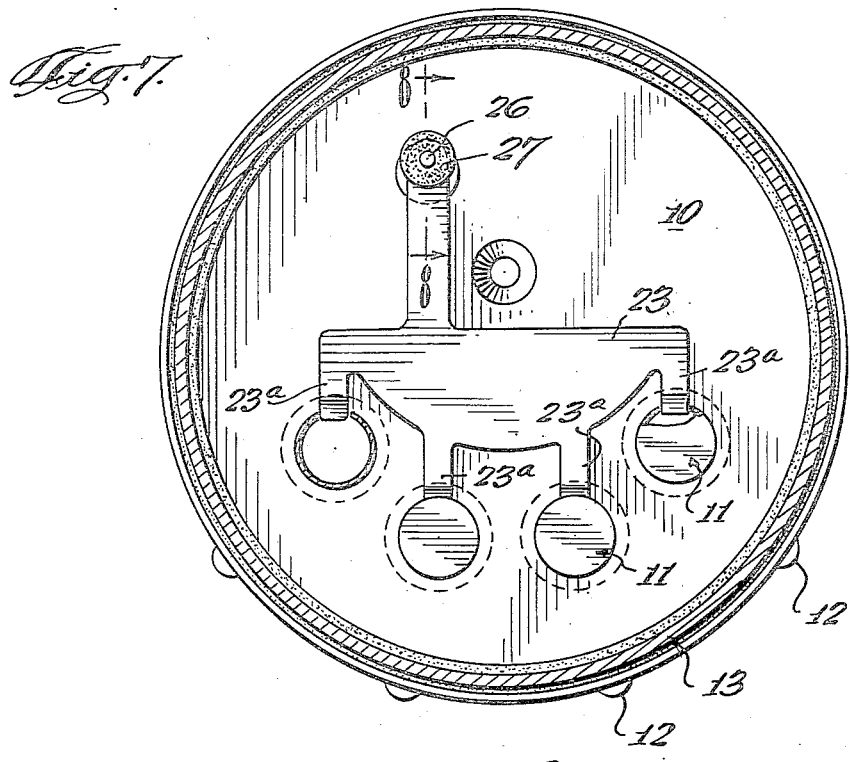
Figure 7 is a bottom view of the lid.
Figure 8:
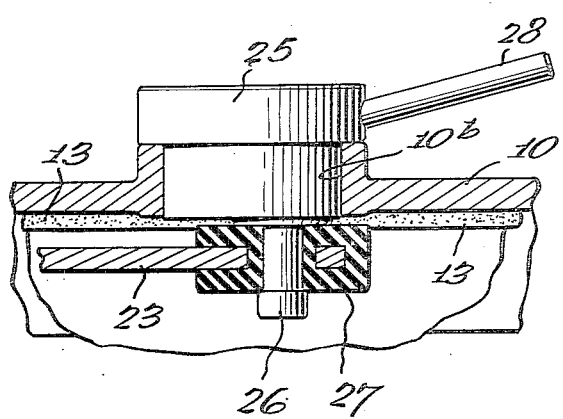
Figure 8 is an enlarged fragmentary view, partially in section, of the valve lifter operating arrangement.

One problem with many automatic shut-off milkers heretofore known is that they have utilized complicated mechanical arrangements for opening the vacuum shut-off valves to initiate the milking operation, some of the prior devices even requiring an individual action to open each of the valves. Such devices are not only difficult to use but their complicated structure requires a very careful washing to insure cleanliness. Another problem is that the flow of milk in some milkers impinges on the float valve in such a manner that it tends to force the valve closed regardless of the buoyancy of the float member. If the valve is closed prematurely, the vacuum will be interrupted leaving the animal only partially milked.

Turning now to the drawings, a milker lid member 10 is shown which may be used with a bucket milker of the type shown in McCornack Patent 1,859,214, carry-away milking apparatus of the character shown in Thomas Patent 2,709,416, or other suitable milk receiver. The lid is provided at the edge which faces the rear of the animal being milked with four housings 11 which extend through the lid. Nipples 12 project outwardly and upwardly from each of the housings 11 and are adapted for connection with the milk tubes of the flexible inflations of teat cup assemblies (not shown), the inflations, milk tubes, nipples 12 and housings 11 comprising means defining milk flow passages which include the bore 12a of each of the nipples. The lid is provided with a downwardly extending peripheral flange 10a within which is carried a gasket 13 adapted for sealed engagement with the open top 14a of milk receiving apparatus 14 which is suitably connected with a source of vacuum (not shown) to provide an operating vacuum for the milker. A post 15 extends upwardly from the top of the lid to support a pulsator (not shown).

Turning now to Figure 4, it will be seen that the housing 11 defines an upper chamber portion 16 and a lower chamber portion 17, the upper end of chamber 16 being closed by a cap 18, preferably of a transparent plastic material, to permit visual inspection of the milk flow. The chambers 16 and 17 are divided generally along the plane of the surface of the lid by a sharp annular shoulder 19 which serves as a valve seat. A float valve member 20 is carried within each housing 11 and has an upper or valve portion 20a disposed within the upper or valve chamber 16 and a hollow float portion 20b within the lower or float chamber 17. At least the valve portion 20a of the float valve is of a resilient material, as rubber, to effect a good seal with the valve seat. When there is no milk in lower chamber 17, valve 20a is seated on shoulder 19 and the valve chamber 16 and milk passage 12a of the nipple are not evacuated.

Carried on the undersurface of lid 10 is a movable member or plate 23 having four valve lifter portions 23a, each associated with one of the housings 11, extending through an opening 24 in the wall thereof adjacent the undersurface of the lid. An operating member 25 is rotatably carried in an opening 10b provided in the surface of the lid and is connected to movable member 23 by an eccentrically mounted pin 26 pressed through an opening in a resilient coupling member 27 carried by movable member 23. A manually engageable pin 28 extends outwardly from member 25 facilitating rotation thereof to effect reciprocation of movable member 23. Such reciprocation causes valve lifter portion 23a to be projected into the associated housing 11 lifting valve 20a off its seat as shown in broken lines in Figure 4. (It will be understood that all four valves are opened at substantially the same time by the action of valve lifter portions 23a.) This provides communication between the milk passage 12a and the evacuated interior of the milker apparatus 14, starting the flow of milk from the animal.

Milk quickly fills the float chamber 17 causing float valve 20 to rise, Figure 5, whereupon movable member 23 may be returned to its original position retracting valve lifter portions 23a. As soon as float chamber 15 is filled, the milk overflows through opening 24 into milk receiver 14.

It will be noted that a small opening 30 is provided in the wall of housing 12 and spaced above the bottom thereof. The milk within chamber 17 drains through this opening in addition to flowing through opening 24;

and at the start of the milking operation, the flow of milk will be more than sufficient to keep chamber 17 full. However, at the end of the milking operation, the flow of milk is considerably lessened and may come only in small dribbles. The float chamber 17 will remain sufficiently full of milk during this period to keep vacuum shut-off valve 20a open for a period of ten to fifteen seconds after milk flow has substantially stopped, providing a "stripping" action. Since float chamber 17 is only slightly larger than float portion 20b, only a small amount of milk is necessary to keep valve 20a open. The drain opening 30 is spaced above the bottom of chamber 17 so that any solid materials or dirt which might accidentally get into the milk will fall to the bottom of the chamber, and not clog opening 30 or pass on into the milker apparatus 14.

When the milk in chamber 17 has dropped below the level necessary to provide buoyancy for the float valve 20, the valve 20a reseats on shoulder 19 interrupting the vacuum applied to milk passageway 12a. The milk flow passage is vented to atmosphere through the small bleeder opening 18a provided in cap 18. This allows the teat cup units to fall from the animal's teats as each quarter milks out. The operator may see at a glance when a cow has been completely milked out.

The milk flow passageway 12a through nipple 12 enters valve chamber 16 through the side wall of housing 11 to that the flow of milk is directed against the reduced neck 20b and the tapered shoulder portion 20c of the float valve 20, below the valve portion 20a thereof. The direction of flow of this milk is such that, while it may tend to force the float valve to one side of the chamber, it has little or no tendency to force the valve downwardly. The flow of milk against and around the float valve will not cause it to seat prematurely.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a milker, apparatus of the character described, comprising: means defining a milk flow passage for connecting an animal's teat with a source of vacuum; said passage having a portion with an axis and a float valve in said passage adjacent said portion, to open the passage in the presence of milk and to close the passage in the absence of milk, the axis of said portion of the passage adjacent said valve being directed toward the side of said float valve whereby milk flowing through said passage impinges on the side of the float valve.

2. In a milker, apparatus of the character described, comprising: means defining a milk flow passage for connecting an animal's teat with a source of vacuum; means defining a chamber in said milk flow passage, having an inlet spaced below the top thereof; and a float valve in said chamber to open the passage in the presence of milk and to close the passage in the absence of milk, said float having a reduced neck and tapered wall portion positioned adjacent said inlet when the valve is in open position, whereby milk flowing through said passage impinges on said reduced neck and tapered wall portion.

3. In a milker, apparatus of the character described, comprising: means defining a milk flow passage for connecting an animal's teat with a source of vacuum; means defining a chamber in said milk flow passage, said chamber having a peripheral valve seat intermediate the ends thereof, an inlet intermediate the valve seat and top thereof and an outlet below said valve seat, the lower portion of said chamber serving as a float chamber; a float valve in said chamber, having an upper valve portion and a lower float portion, the valve portion seating on said valve seat in the absence of milk in said chamber and lifting off said seat in the presence of milk in the chamber, the valve portion being above said inlet when opened whereby the flow of milk therethrough impinges on the side wall of said float portion.

4. In a milker, apparatus of the character described, comprising: means defining a milk flow passage for connecting an animal's teats with a source of vacuum; means defining a chamber having a side wall in said flow passage; and a float valve in said chamber to open the passage in the presence of milk and to close the passage in the absence of milk, there being a restricted drain opening in the side wall of said chamber and spaced above the bottom thereof whereby said float valve remains open for a period of time after the flow of milk has ceased.

5. A semi-automatic valve control mechanism for a milking machine having four teat connections for conducting milk by vacuum to a milk receiver, said valve mechanism including four individual casings, one interposed in each of four milk conducting conduits adjacent the milk receiver, said casings each having an inlet for the introduction of milk into the upper portion thereof and each having a discharge outlet adjacent the upper portion thereof, four floats, one within each casing, and each movable with relation to the associated discharge outlet, four closure members, one carried by each float, and interposed between the inlet and outlet of the associated casing, four lift rods each projecting through the discharge outlet of one of said casings and movable to lift the closure member therein away from the discharge outlet permitting passage of milk through the casing at the inception of the milking operation and subsequently to free said floats for response to diminishing flow of milk effecting an automatic return of each closure member into position upon the associated discharge outlet upon completion of the milking operation, and a single, manually engageable operating member, operably connected with all four of said lift rods, and movable to effect simultaneous movement of said lift rods to lift said closure members.

6. In a milker, apparatus of the character described, comprising: a lid member for the milker; means defining a plurality of milk flow passages extending through said lid for connecting an animal's teats with a source of vacuum and including means defining chambers forming a part of the passages, said chambers each having an opening therein; a float valve in each of said chambers and responsive to milk therein, movable between a first position to open the passages in the presence of milk and a second position to close the passages in the absence of milk; a mechanism carried on said lid including a plurality of valve lifter portions projectable through said openings into the chambers to open said valves to start the flow of milk through the passages, and an operating portion; and means mounting said operating portion on said lid for movement in a plane at an angle to the direction of movement of said valves to effect movement of said valve lifter portions.

7. Apparatus of the character described in claim 6, wherein said chamber has a side wall and a drain opening is provided in said side wall and spaced above the bottom of the chamber.

8. In a milker, apparatus of the character described, comprising: a lid member for the milker; means defining a plurality of milk flow passages for connecting an animal's teats with a source of vacuum and including means defining a chamber forming a part of the passages and extending through said lid, said chambers each having an opening therein on the underside of the lid; a float valve in each of said chambers and responsive to milk therein, movable between a first position to open the passages in the presence of milk and a second position to close the passages in the absence of milk; a mechanism carried on said lid including a plurality of valve lifter portions projectable through said openings into the chambers to open said valves to start the flow of milk through the passages, and an operating portion; and means operably mounting said operating portion on said lid for movement in a plane generally at right angles to the direction of movement of said valves to effect projection of said valve lifter portions opening said valves.

9. In a milker, apparatus of the character described, comprising: means defining a milk flow passage for connecting an animal's teat with a source of vacuum; and a float valve in said passage movable between a first position to open the passage in the presence of milk and a second position to close the passage in the absence of milk, said float valve having a surface at other than a right angle with respect to the direction of movement of the valve, against which milk flowing through said passage impinges, said valve tending to remain open despite the flow of milk against it.

10. In a milker, apparatus of the character described, comprising: a lid member for the milker; means defining a plurality of milk flow passages for connecting an animal's teats with a source of vacuum and including means defining a chamber forming a part of the passages and extending through said lid, said chambers each having an opening therein on the underside of the lid; a float valve in each of said chambers and responsive to milk therein to open the passages in the presence of milk and to close the passages in the absence of milk; a movable member on the underside of said lid and having valve lifter portions projectable to open the valves, to start the flow of milk through said passages; and an operating member rotatably mounted on said lid, extending therethrough and having an eccentric connection with said movable member.

11. In a milker, apparatus of the character described, comprising: a lid member for the milker; means defining a plurality of milk flow passages for connecting an animal's teats with a source of vacuum and including means defining a chamber forming a part of the passages and extending through said lid, said chambers each having an opening therein on the underside of the lid; a float valve in each of said chambers and responsive to milk therein to open the passages in the presence of milk and to close the passages in the absence of milk; a movable member on the underside of said lid and having valve lifter portions projectable to open the valves, to start the flow of milk through said passages, said valve lifter portions engaging the edges of said openings, guiding the movement of said member; and an operating member mounted on said lid and connected to said movable member to effect translational movement thereof.

12. In a milker, apparatus of the character described, comprising: means defining a plurality of milk flow passages for connecting an animal's teats with a source of vacuum; a plurality of valves, one in each of said passages, and movable in response to milk therein between a first position to open the passages in the presence of milk and a second position to close the passages in the absence of milk; and a single mechanism operably associated with said valves for movement mechanically opening the valves to start the flow of milk through the passages, said mechanism having a portion movable in a direction transverse to the direction of movement of said valves and including a camming connection for effecting movement of said valves from said second position to said first position.

13. In a milker, apparatus of the character described, comprising: means defining a plurality of milk flow passages for connecting an animal's teats with a source of vacuum; a plurality of valves, one in each of said passages, and movable in response to milk therein between a first position to open the passages in the presence of milk and a second position to close the passages in the absence of milk; a single member having a plurality of valve engaging portions, each operably associated with one of said valves, said member being movable to effect movement of said valves between said second and first positions to start the flow of milk through the passages; and an operating element operably associated with said member and rotatable about an axis generally parallel to the direction of movement of said valves for effecting movement of said member to open said valves.

14. In a milker, apparatus of the character described, comprising: a lid member for the milker; means defining four milk flow passages extending through said lid for connecting an animal's teats with a source of vacuum and including means defining four chambers each forming a part of one of said passages; a float valve in each of said chambers and movable in response to milk therein between a first position to open the passage in the presence of milk and a second position to close the passage in the absence of milk, the movement of said float valves being in a direction transverse to the plane of said lid; and a single mechanism having a valve engaging portion associated with each of said valves and movable to effect movement of said valves between said second and first positions, said mechanism having a portion movable in a direction generally parallel to the surface of said lid and including a camming connection for effecting the desired movement of said valves.

15. In a milker, apparatus of the character described, comprising: a lid for the milker; means defining four milk flow passages extending through said lid for connecting an animal's teats with a source of vacuum and including means defining four chambers arranged in a semicircle on one edge of said lid and each forming a part of one of said passages; a float valve in each of said chambers and movable in response to milk therein between a first position to open the passage in the presence of milk and a second position to close the passage in the absence of milk; a single member having a plurality of valve engaging portions, each operably associated with one of said valves, said member being movable to effect movement of said valves between said second and first positions to start the flow of milk through the passages; and an operating element operably associated with said member and mounted on said lid for rotation about an axis generally parallel to the direction of movement of said valves for effecting movement of said member to open said valves, said operating element having a manually engageable portion adjacent the edge of said lid opposite said chambers.

References Cited in the file of this patent

UNITED STATES PATENTS

| | | |
|---|---|---|
| 2,006,272 | Hurlburt | June 25, 1935 |
| 2,466,841 | Eades | Apr. 12, 1949 |
| 2,685,862 | Hill et al. | Aug. 10, 1954 |
| 2,718,208 | Tanner | Sept. 20, 1955 |

FOREIGN PATENTS

| | | |
|---|---|---|
| 27,102 | Denmark | Jan. 5, 1921 |